United States Patent
Lee et al.

(10) Patent No.: US 8,059,518 B2
(45) Date of Patent: Nov. 15, 2011

(54) DATA STORAGE APPARATUS, ASSEMBLING METHOD THEREOF AND APPARATUS FOR GENERATING TRACKING POSITION ERROR SIGNAL

(75) Inventors: Choong Woo Lee, Seoul (KR); Young Sik Kim, Seoul (KR); Jun Moon, Seoul (KR); Ji Young Jeong, Seoul (KR); Chung Choo Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 925 days.

(21) Appl. No.: 12/042,148

(22) Filed: Mar. 4, 2008

(65) Prior Publication Data
US 2008/0218897 A1 Sep. 11, 2008

(30) Foreign Application Priority Data
Mar. 5, 2007 (KR) .......................... 10-2007-0021477

(51) Int. Cl.
*G11B 5/596* (2006.01)

(52) U.S. Cl. ................... 369/126; 977/947; 360/77.03
(58) Field of Classification Search ................. 369/100, 369/126; 360/77.03
See application file for complete search history.

(56) References Cited

U.S. PATENT DOCUMENTS
2007/0008864 A1 * 1/2007 Fan et al. ..................... 369/126
* cited by examiner

*Primary Examiner* — Hoa T Nguyen
*Assistant Examiner* — Andrew Sasinowski
(74) *Attorney, Agent, or Firm* — Birch, Stewart, Kolasch & Birch, LLP

(57) ABSTRACT

Disclosed are a data storage apparatus, an assembling method thereof and an apparatus for generating a tracking position error signal capable of storing data using recording media formed with patterns for generating tracking position error signals to obviate errors that may be generated amidst storage of the data, wherein the patterns are formed for generating tracking position error signals on recording media before the recording media and storage are assembled to reduce the manufacturing cost and manufacturing process time.

8 Claims, 13 Drawing Sheets

DATA STORAGE APPARATUS, ASSEMBLING METHOD THEREOF AND APPARATUS FOR GENERATING TRACKING POSITION ERROR SIGNAL

CROSS-REFERENCE TO RELATED APPLICATION

The present application is based on, and claims priority from, Korean Application Numbers 10-2007-0021477 filed Mar. 5, 2007, the disclosure of which is incorporated herein by reference in its entirety.

BACKGROUND

The following description relates generally to a data storage apparatus, an assembling method thereof and an apparatus for generating a tracking position error signal.

As emerging demands on media capable of storing large amounts of data have increased over the past years, researches and developments on increased storage capacity have been also on the rise. An SDS {SPM (Scanning Probe Microscope)-based Data Storage System}, which is an AFM (Atomic Force Microscopy)-method next generation large data storage system, has suddenly surfaced as a probe storage capable of replacing the future HDDs (Hard Disk Drives) and semiconductor memories due to its merits such as large storage capacity, small size and inexpensive cost.

When data is stored in the SDS, tracks must be searched and read with a precise resolution because bit size is around nano meter. For an accurate tracking, the conventional storage media like the HDDs use a PES (Position Error Signal), where a head is positioned to follow an accurate position of a track. The PES in the SDS is a signal indicating how far a cantilever tip for reading data is deviated from the track. FIGS. 1a, 1b and 1c are schematic views illustrating a PES generating method according to prior art, where servo pits are made on recording media by a cantilever tip to generate the PES. In other words, FIGS. 1a, 1b and 1c show how servo pits (A, B, C, D) are formed on respectively different positions of a recording medium, and the PESs are generated by the servo pits.

Referring first to FIG. 1a, a position of a servo pit 'B' is downshifted from a center of servo pit 'A' as far down as 'd', where the 'd' is a diameter. A position of a servo pit 'C' is downshifted from the center of the servo pit 'A' as much as d/2, and a P signal and a Q signal (which are PESs) generated from the servo pits are illustrated, where a track pitch (TP) is 3 d/2.

A track pitch (TP) in FIG. 1b is 3 d/2, which is the same as that of FIG. 1a, but a center of the serve pit 'B' is distanced from the center of servo pit 'A' as far as 'TP-d', while a center of the servo pit 'C' is distanced from the center of the servo pit 'A' as far as 'TP/4', which is the diameter. Therefore, the PESs generated from these servo pits are shown as the P signal and the Q signal.

Referring to FIG. 1c, a track pitch (TP) is 3 d/2, which is not same as that of FIGS. 1a and 1b, but the servo pits 'A' and 'B' are distanced as far as 'TP/2' and the center of the servo pit 'C' is positioned above from the center of servo pit 'A' as far as 'TP/4', which is the diameter. The PESs generated by these servo pits come to become more curved than what is illustrated in FIGS. 1a and 1b.

The method of generating PESs suggested by the prior art suffers from a shortcoming that the PESs are generated by recording patterns of servo pits using cantilever tips after recording media are completely assembled to create an error of data storage on the recording media due to errors generated during recording of the servo pits. The method suffers from another shortcoming that process times are required for recording the servo pits for data storage.

SUMMARY

An object of the instant disclosure is to provide a data storage apparatus, an assembling method thereof and an apparatus for generating a tracking position error signal capable of storing data using recording media formed with patterns for generating tracking position error signals to thereby reduce errors that may be generated amidst storage of the data.

Another object is to provide a data storage apparatus, an assembling method thereof and an apparatus for generating a tracking position error signal capable of forming patterns for generating tracking position error signals on recording media before the recording media and storage are assembled to thereby reduce the manufacturing cost and manufacturing process time.

In one general aspect, a data storage apparatus comprises: a recording medium formed on an upper partial portion thereof with a striped first pattern and an inclined second pattern; and a storage capable of storing data in the recording medium using signals detected by the patterns.

In another general aspect, an apparatus for generating a tracking position error signal comprises: a first cantilever unit for detecting a servo pattern of a recording medium formed with a servo pattern and a sync pattern capable of generating a tracking position error signal, and outputting a signal; a second cantilever unit for outputting a signal by detecting the sync pattern of the recording medium; a first comparator for receiving the signal outputted by the first cantilever unit and a reference signal, comparing the signal with the reference signal and outputting a signal relative to a comparative result; a second comparator for receiving the signal outputted by the second cantilever unit and a reference signal, comparing the signal with the reference signal and outputting a signal relative to a comparative result; a frequency multiplier for multiplying a frequency of the signal outputted by the second comparator to output a reference clock signal; a counter for counting the reference clock signal by receiving the reference clock signal of the frequency multiplier to output a tracking position error signal; and a digital logic processor for receiving the signals from the first and second comparators to output to the counter one signal out of a start signal, a stop signal and a reset signal.

In still another general aspect, an assembling method of data storage apparatus comprises: forming patterns on an upper partial portion of a recording medium capable of generating tracking position error signals; assembling by positioning on an upper portion of the recording medium a storage storing data in the recording medium using signals detected by the patterns.

DETAILED DESCRIPTION

Now, exemplary implementations of the present inventive disclosure will be described in detail with reference to the accompanying drawings. In this application, the use of the singular includes the plural unless specifically stated otherwise. Furthermore, the use of the term "including", as well as other forms, such as "includes" and "included", is not limiting. Wherever possible, the same reference numbers will be used throughout the drawings to refer to the same or like parts.

Figure 1A:
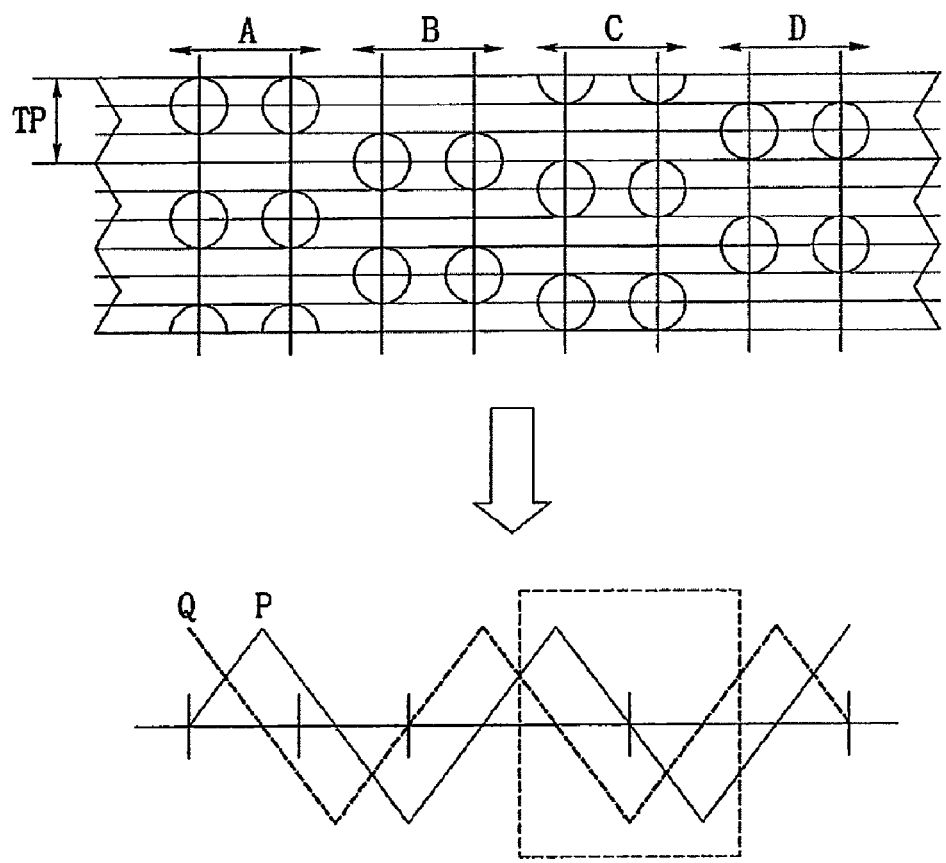
FIGS. 1a, 1b and 1c illustrate schematic renditions for explaining a PES (Position Error Signal) according to prior art.
Figure 1B:
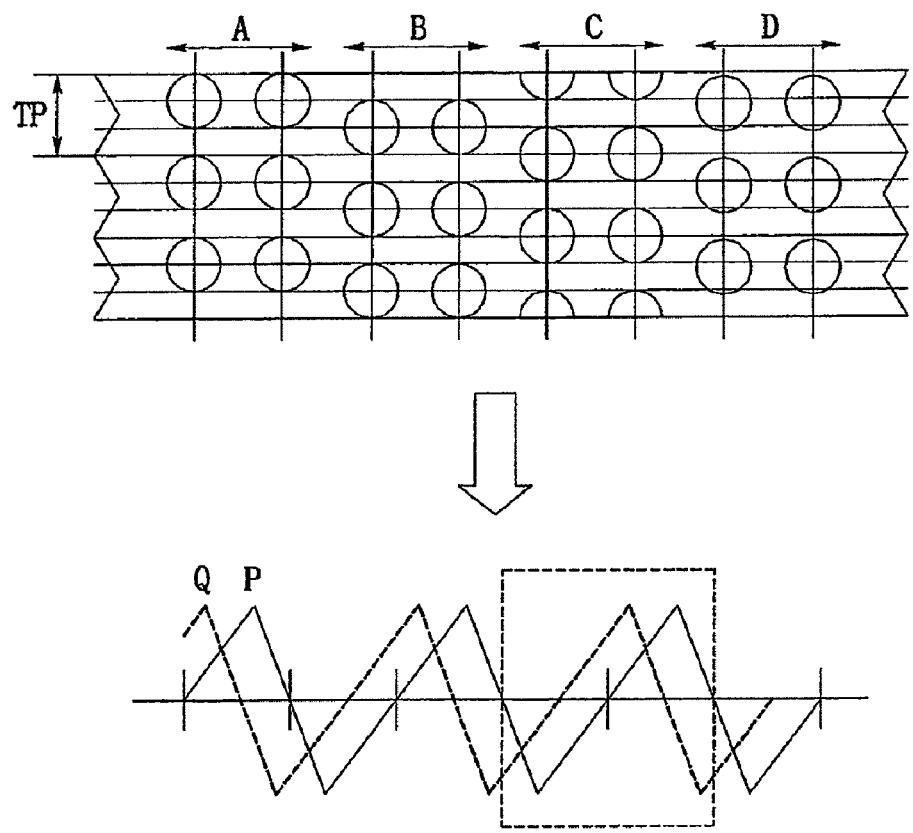
Figure 1C:
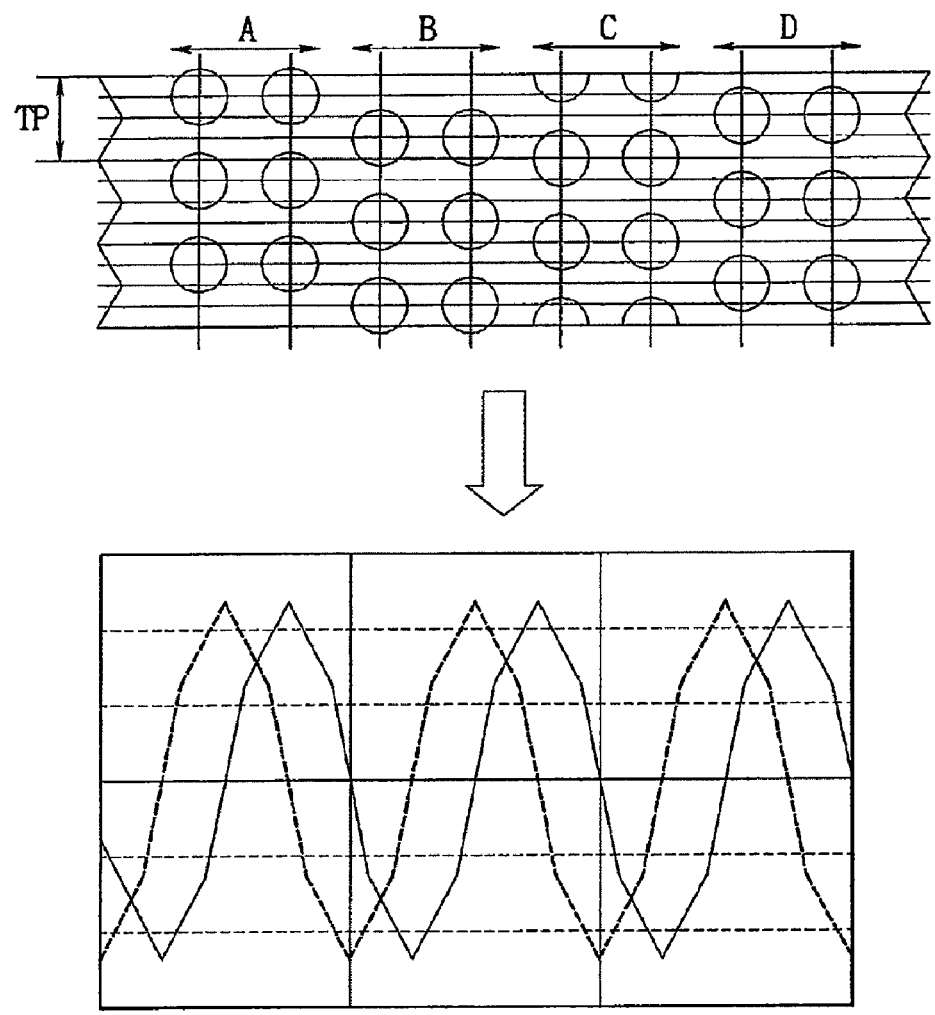
Figure 2:
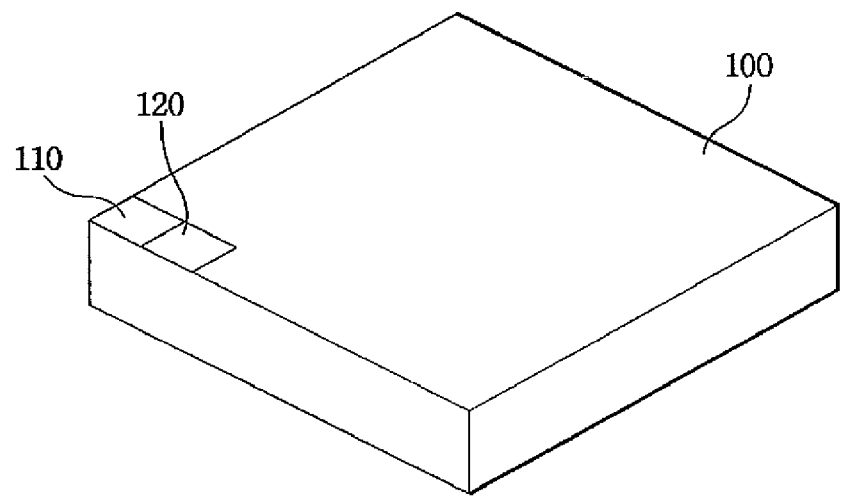
FIG. 2 illustrates a schematic perspective view of a recording medium formed with patterns for generating tracking position error signals.

Referring to FIG. 2, a recording medium (100) may be formed thereon with sync patterns (110) and servo patterns (120) for generating tracking position error signals. In the present implementation, the sync patterns (110) and the servo patterns (120) may generate the tracking position error signals. Therefore, the present implementation has an advantage in that data can be stored using a recording medium formed with patterns capable of generating the tracking position error signals to thereby reduce errors that might be generated during the data storage.

Figure 3A:
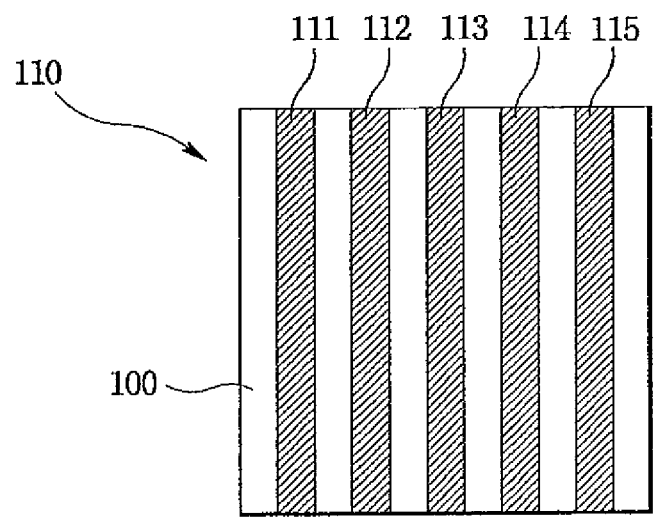
FIGS. 3a and 3b illustrate schematic renditions of patterns formed on a recording medium for generating tracking position error signals.
Figure 3B:
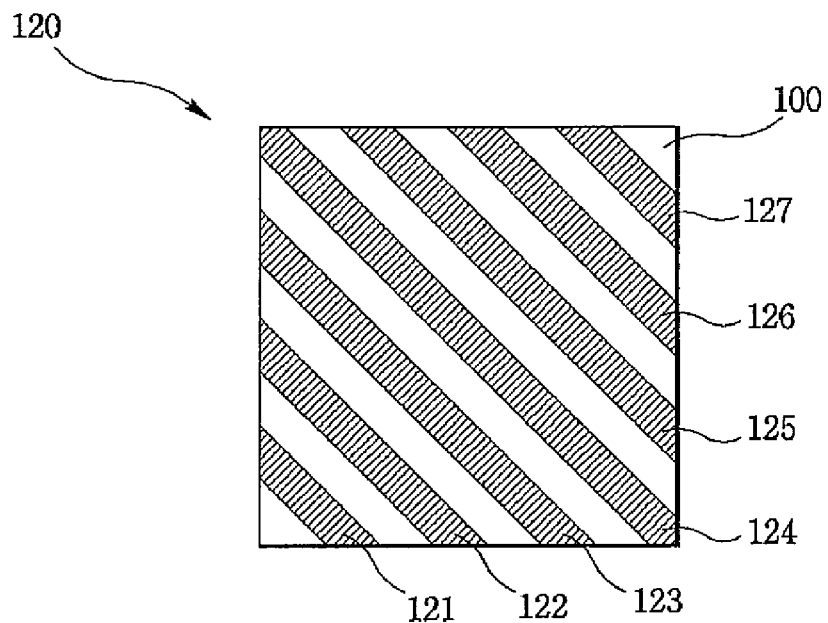

Now, referring to FIGS. 3a and 3b, the sync patterns (110) formed on an upper surface of the recording medium (100) may include striped indentations (111, 112, 113, 114, 115) as shown in FIG. 3a. The servo patterns (120) may be comprised of inclined indentations (121, 122, 123, 124, 125, 126, 127) as shown in FIG. 3b.

In other words, the recording medium (100) is formed at a partial upper portion thereof with a striped first pattern and an inclined second pattern, where the first pattern is a sync pattern and the second pattern is a servo pattern. Furthermore, the first pattern and the second pattern may be formed on a respectively different position on the same recording medium.

Figure 4:
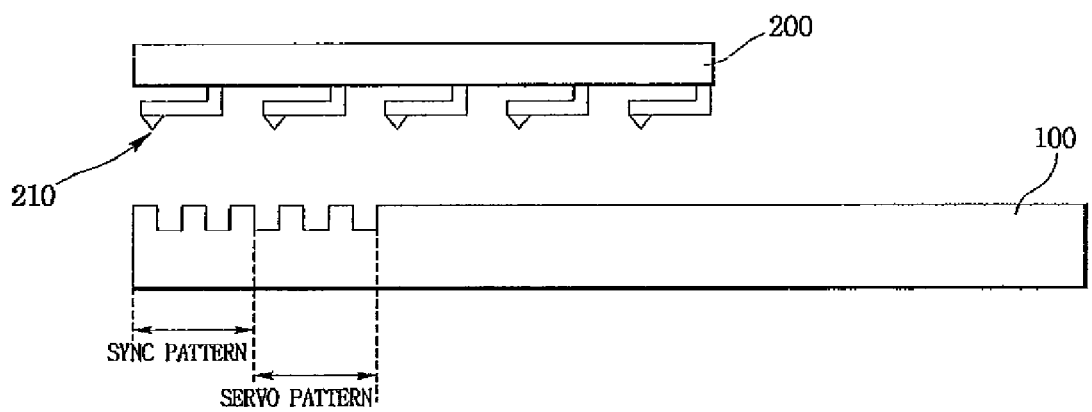
FIG. 4 illustrates a schematic cross-sectional view of a data storage apparatus.

Referring to FIG. 4, a data storage apparatus may comprise: a recording medium (100) formed on an upper partial portion thereof with patterns capable of generating tracking position error signals; and a storage (200) capable of generating tracking position error signals by signals detected by the patterns capable of generating the tracking position error signals using an AFM (Atomic Force Microscopy) and storing information in the recording medium (100) using the tracking position error signals.

Preferably, the patterns capable of generating the tracking position error signals may be sync patterns (110) comprised of striped indentations and servo patterns (120) comprised of inclined indentations. The recording medium (100) may be formed beforehand with the sync patterns (110) and the servo patterns (120).

In order to store data in the data storage apparatus thus constructed, the sync patterns (110) and the servo patterns (120) of the recording medium (100) may be detected by the AFM to generate the tracking position error signals of a track for storing the data. By doing so, data can be stored along a precise position of a track of the recording medium (100) using the tracking position error signals. Preferably, the recording medium (100) is made of polymer.

Figure 7:
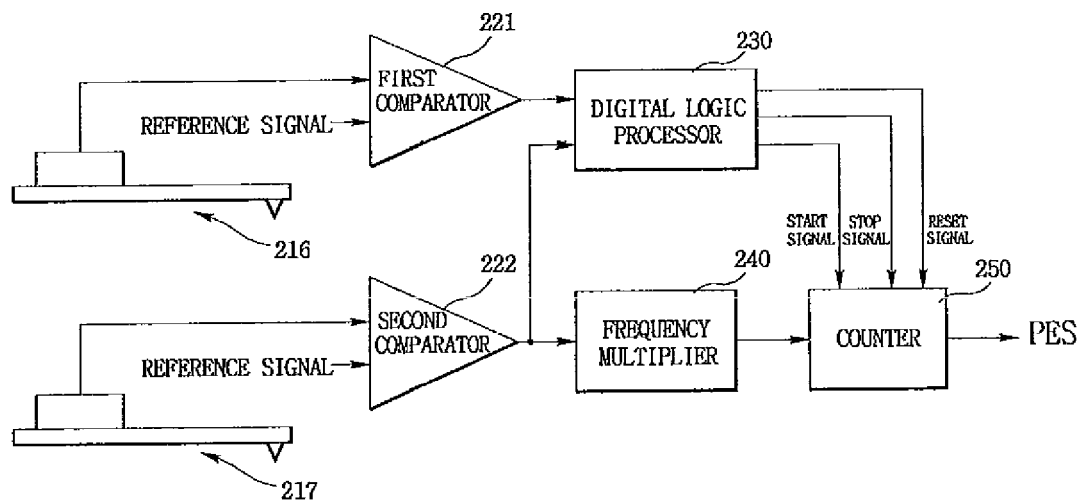
FIG. 7 illustrates a schematic conceptual rendition of an apparatus for generating tracking position error signals.

Furthermore, the sync patterns (110) and the servo patterns (120) are formed in advance on the recording medium (100) by performing a nano imprint process before assembly of the recording medium (100) and the storage (200). The storage (200) may comprise any structure, but preferably in plural form, for detecting the sync patterns (110) and the servo patterns (120) by the AFM and storing the patterns, and comprise cantilevers (210) disposed at distal ends with probes. Preferably, the storage (200) is disposed with a generating apparatus (as shown in FIG. 7) capable of generating a tracking position error signal by detecting patterns for generating the tracking position error signals.

As explained above, the data storage apparatus of FIG. 4 is operated in such a manner that the storage stores data on the recording medium using the AFM. However it should be noted that it is not limited to a fact that the storage stores data on the recording medium using the AFM only.

In other words, the data storage apparatus of the instant novel concept may include storage capable of storing data on the recording medium using, for example, but not limited to, electrical, magnetic, optical and physical transformation methods. Therefore, the data storage apparatus comprises: a recording medium formed on an upper partial portion thereof with a striped first pattern and an inclined second pattern; and a storage storing data in the recording medium using signals detected by the patterns. Furthermore, the data storage apparatus of the present disclosure is preferably of an SDS {SPM (Scaning Probe Microscope)-based Data Storage System}.

In other words, a method of storing data on the recording medium by the storage is the SDS {SPM (Scaning Probe Microscope)-based Data Storage System}.

Figure 5:
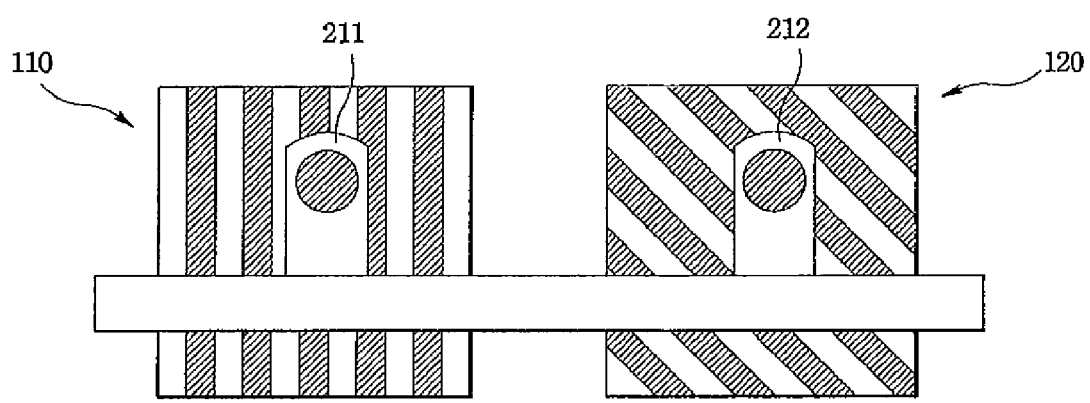
FIG. 5 is a schematic conceptual drawing illustrating a state in which a cantilever detects sync patterns and servo patterns.

FIG. 5 is a schematic conceptual drawing illustrating a state in which a cantilever detects sync patterns and servo patterns, where the sync patterns (110) and the servo patterns (120) are respectively detected by a cantilever (211, 212). In other words, the cantilevers are aligned in matrix formation in the storage, where parallel cantilevers (211, 212) are horizontally and vertically moved to detect the sync patterns (110) and the servo patterns (120).

Figure 6A:
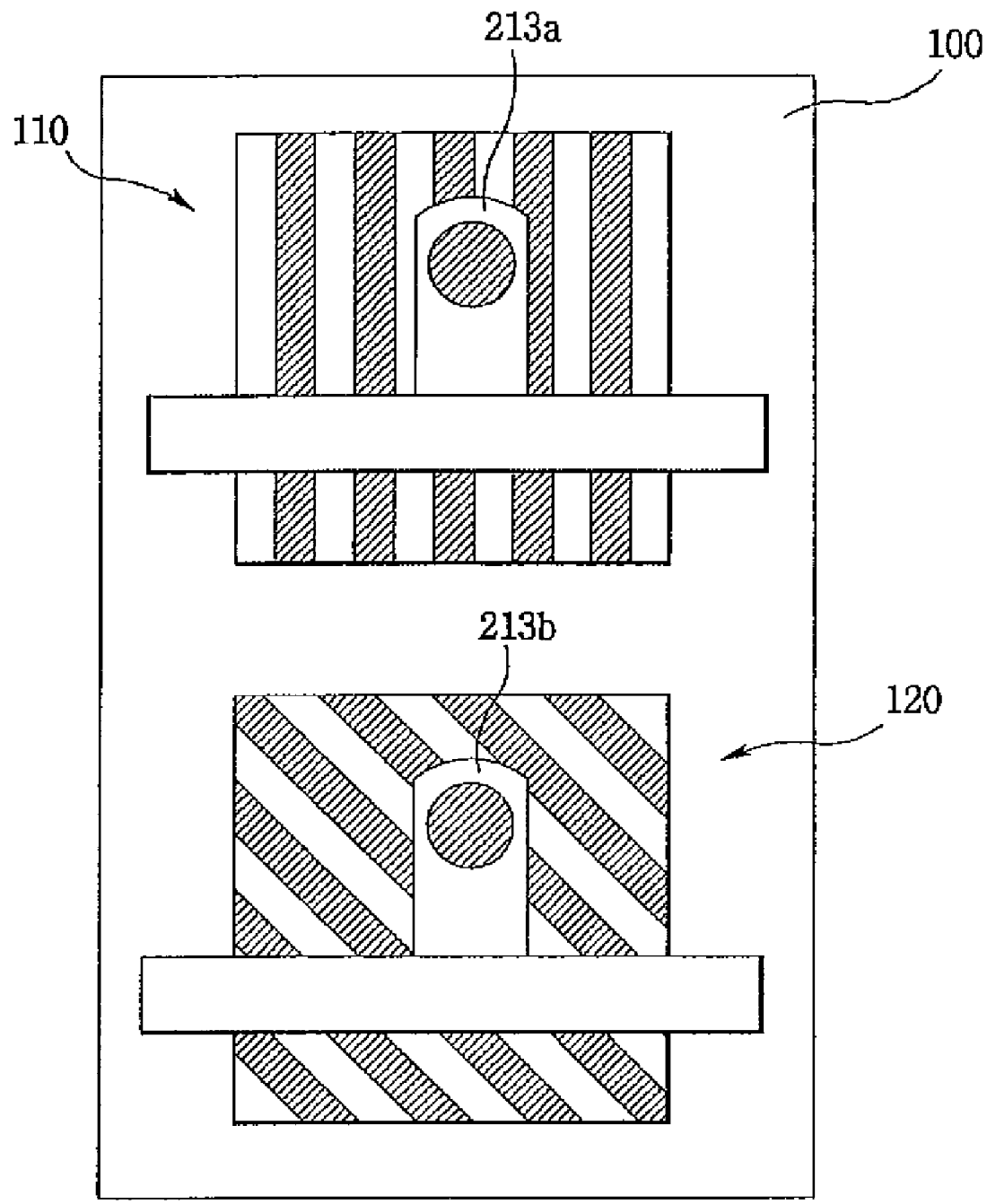
FIGS. 6a, 6b and 6c are schematic renditions illustrating a state how a cantilever detects in response to positions formed by the sync patterns and servo patterns.
Figure 6B:
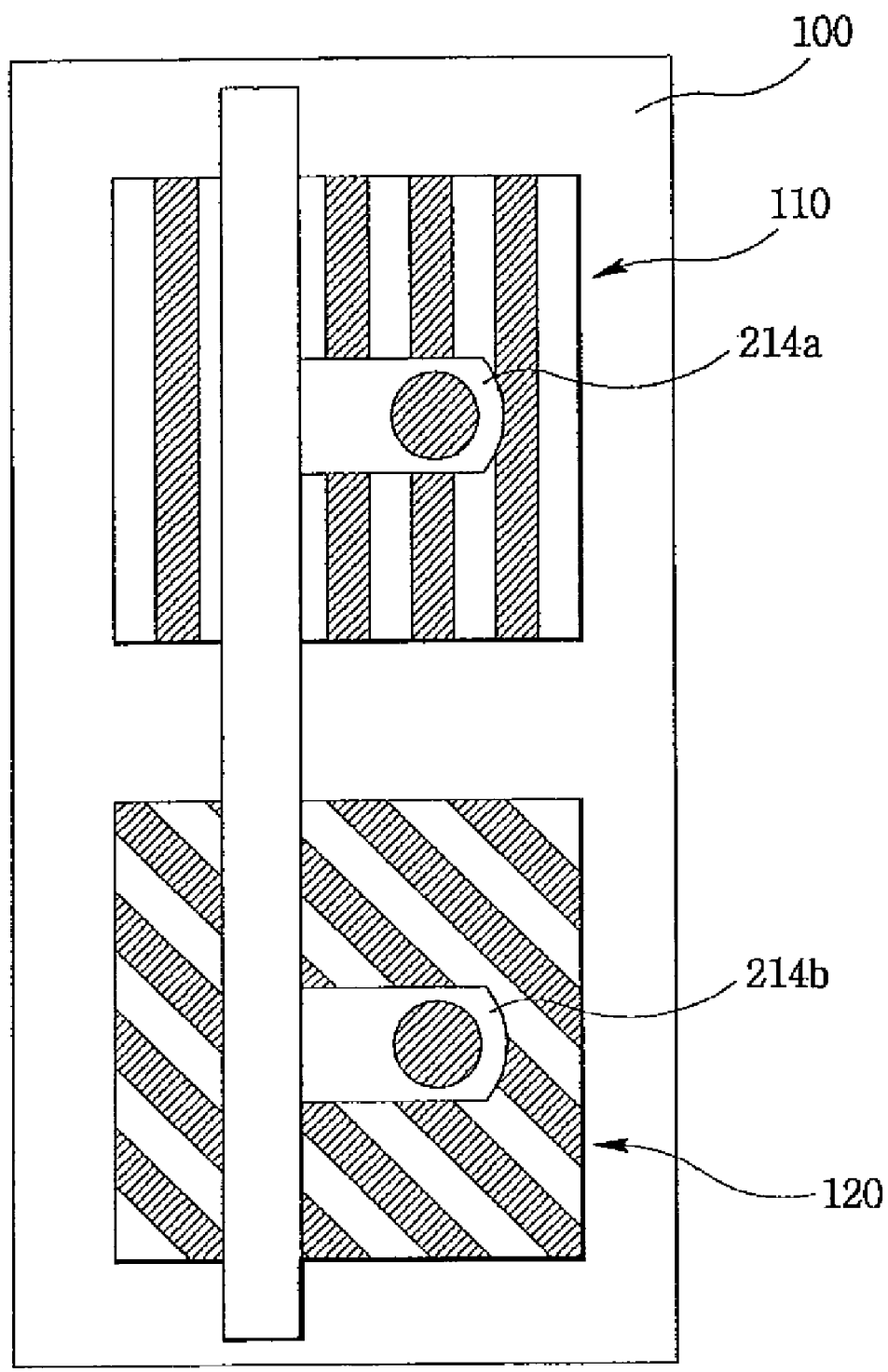
Figure 6C:
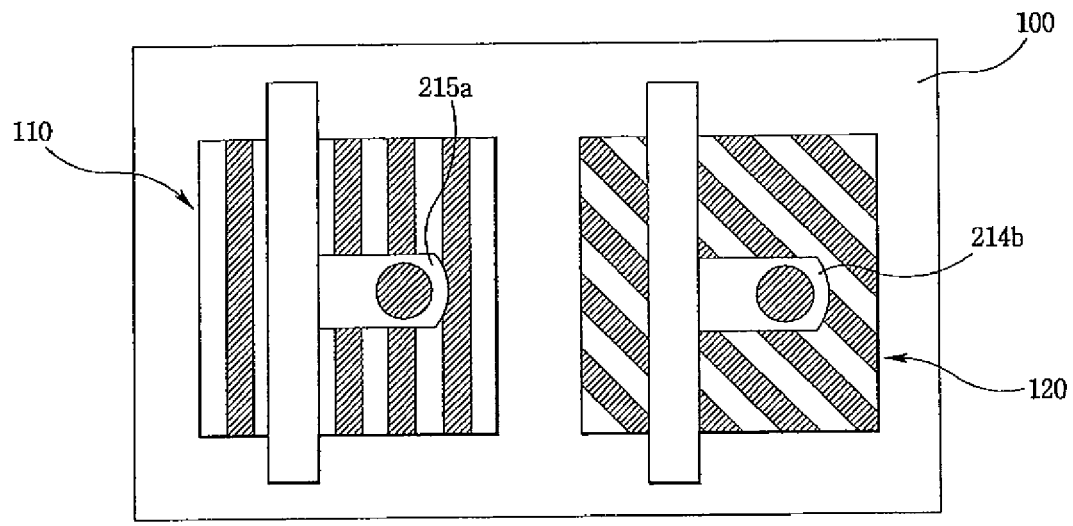

Now, referring to FIGS. 6a, 6b and 6c, the sync patterns and servo patterns, which are patterns for generating the tracking position error signals, may be aligned at various positions in the recording medium.

In other words, as shown in FIGS. 6a and 6b, in case the sync patterns (110) and the servo patterns (120) are vertically aligned in the recording medium (100), the patterns may be detected by the horizontally aligned cantilevers (213a, 213b) (see FIG. 6a), while the patterns may be detected by vertically aligned cantilevers (214a, 214b) (see FIG. 6b). Furthermore, as illustrated in FIG. 6c, in case the sync patterns (110) and the servo patterns (120) may be horizontally aligned in the recording medium (100), the patterns may be detected by the vertically aligned cantilevers (215a, 215b). It is needless to say that the patterns may be detected by horizontally aligned cantilevers.

Referring now to FIG. 7, an apparatus for generating a tracking position error signal comprises: a first cantilever unit (216) for detecting a servo pattern of a recording medium formed with a servo pattern and a sync pattern capable of generating a tracking position error signal, and outputting a signal; a second cantilever unit (217) for outputting a signal by detecting the sync pattern of the recording medium; a first comparator (221) for receiving the signal outputted by the first cantilever unit (216) and a reference signal, comparing the signal with the reference signal and outputting a signal relative to a comparative result; a second comparator (222) for receiving the signal outputted by the second cantilever unit (217) and a reference signal, comparing the signal with the reference signal and outputting a signal relative to a comparative result; a frequency multiplier (240) for multiplying a frequency of the signal outputted by the second comparator (222) to output a reference clock signal; a counter (250) for counting the reference clock signal by receiving the reference clock signal of the frequency multiplier (240) to output a tracking position error signal; and a digital logic processor (230) for receiving the signals from the first and second comparators (221, 222) to output to the counter one signal out of a start signal, a stop signal and a reset signal.

In order to drive the apparatus thus constructed for generating a tracking position error signal, a recording medium formed with servo patterns and sync patterns may be first prepared.

Successively, the sync patterns and the servo patterns of the recording medium may be detected by the first and second cantilever units (216, 217), and signals outputted from the first and second cantilever units (216, 217) may be received by the first and second comparators (221, 222) and compared with the reference signal, where a signal relative to a comparative result may be outputted to the digital logic processor (230).

Thereafter, a frequency of the signal outputted by the second comparator may be multiplied by the frequency multiplier (240), where the reference clock signal may be outputted to the counter (250). The frequency multiplier (240) may use a PLL (Phase-Locked Loop) signal to multiply by N folds a frequency of the signal outputted from the second comparator.

The counter (250) may count the reference clock signal of the frequency multiplier (240) by a start signal of the digital logic processor (230), terminate the counting by the start signal of the digital logic processor (230) and output a tracking position error signal (PES). The counter (250) may count only a region where indentations of the servo patterns of the recording medium and indentations of the sync patterns are overlapped, and the count may be controlled by the digital logic processor (230).

Figure 8:
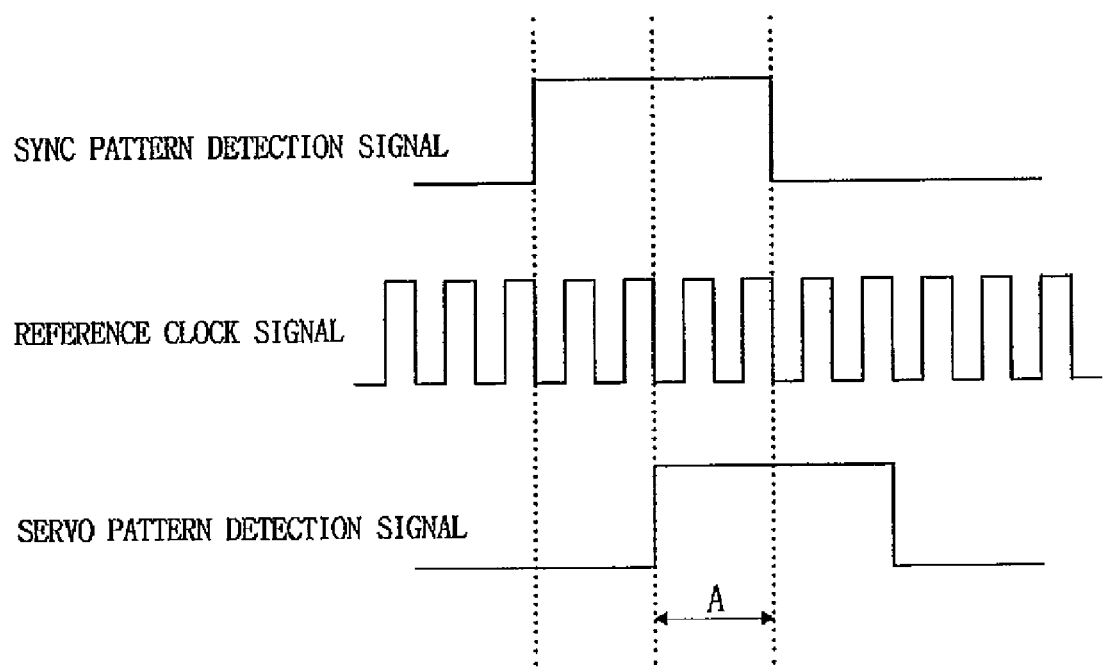
FIG. 8 illustrates a schematic conceptual rendition explaining how to count for generating tracking position error signals.

Referring to FIG. 8, in case an indentation region of the sync patterns and servo patterns of the recording medium is read as data 'I', while a region of no indentations is read as '0', a detection signal appears. At this time, a tracking position error signal is generated by counting a reference clock signal of a region 'A' where indentation of the sync patterns and indentation of the servo patterns are overlapped. The tracking position error signal may indicate how far a cantilever is deviated from a center of the track.

Figure 9:
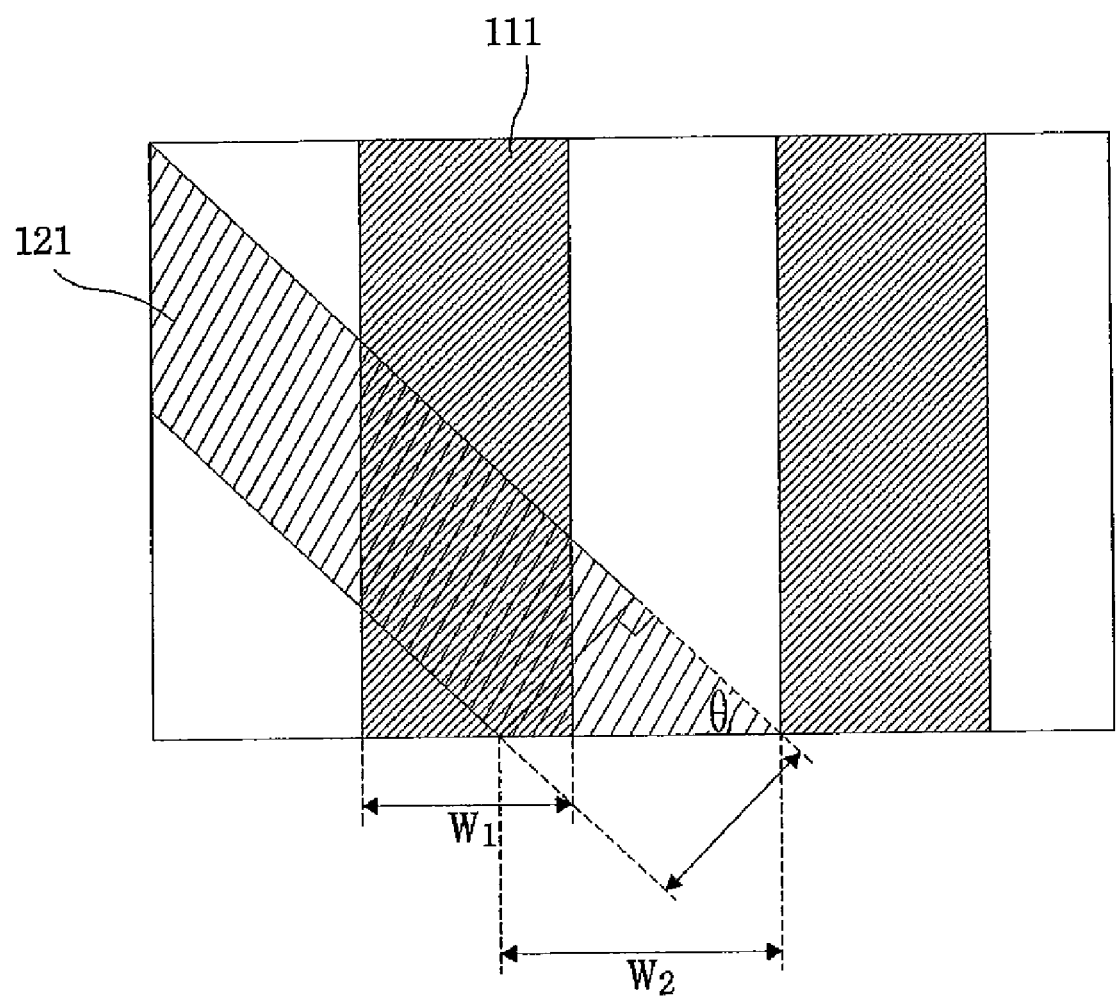
FIG. 9 is a rendition illustrating a servo pattern whose vertical pitch is the same as a horizontal pitch of a sync pattern.
Figure 10:
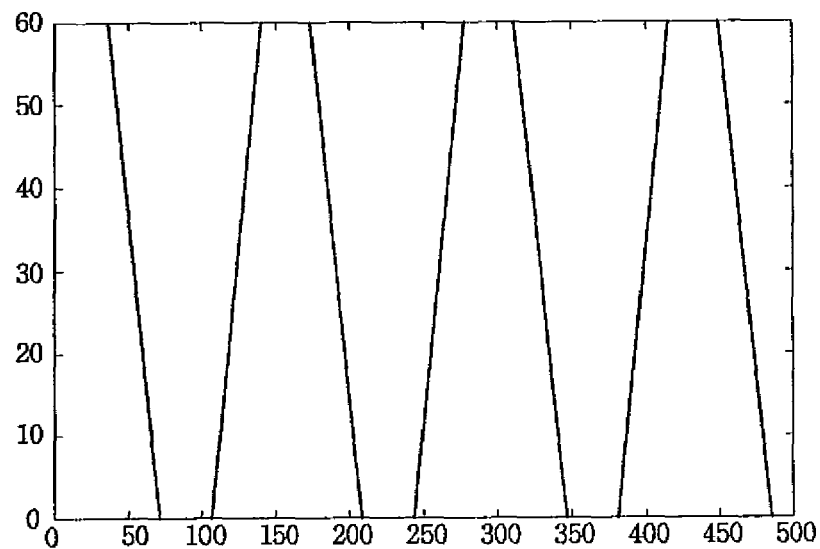
FIG. 10 illustrates a tracking position error signal graph generated in FIG. 9.

Referring now to FIG. 9, if a pitch of a horizontal sync pattern is 'W1', a pitch of a horizontal servo pattern (121) is 'W2', a pitch of a vertical servo pattern (121) is 'A3' and the pitch (W1) of the horizontal sync pattern (111) is the same as the pitch (W3) of the vertical servo pattern (121), W1/W2 =sin θ, where if θ=30°, a tracking position error signal 'PES' may be generated as shown in FIG. 10 only when the sync pattern is an even number or an odd number.

Under this circumstance, if θ=30°, the tracking position error signal 'PES' may be generated per bit, but if θ is not 30°, the tracking position error signal 'PES' may be shifted to make it difficult to obtain an accurate tracking.

The following Table 1 shows principal factors that are extracted if the pitch of the horizontal sync pattern and the pitch of the vertical servo pattern are the same,

TABLE 1

| Relations between Tracks | W2 = W1/sinθ |
|---|---|
| Bit Size | $2\dfrac{W1}{\sqrt{3}}$ |
| Track Pitch | $2\dfrac{W1}{\sqrt{3}}$ |
| Horizontal distance between bits (Bit Length) | 2W1 |
| TPI (Track per Inch) | $\dfrac{1\text{ inch}}{2W\sqrt{3}}$ |
| Storage Density | $\dfrac{\sqrt{3}}{4WI^2}$ |

Figure 11:
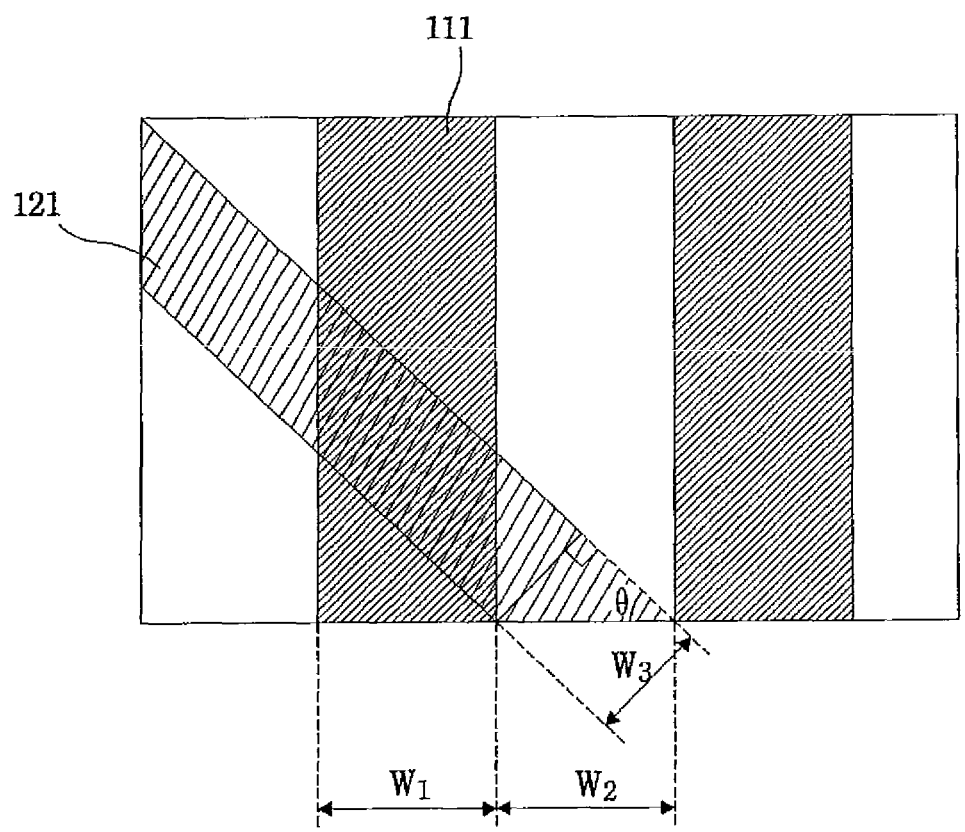
FIG. 11 is a rendition illustrating a servo pattern whose horizontal pitch is the same as the pitch of a sync pattern.
Figure 12:
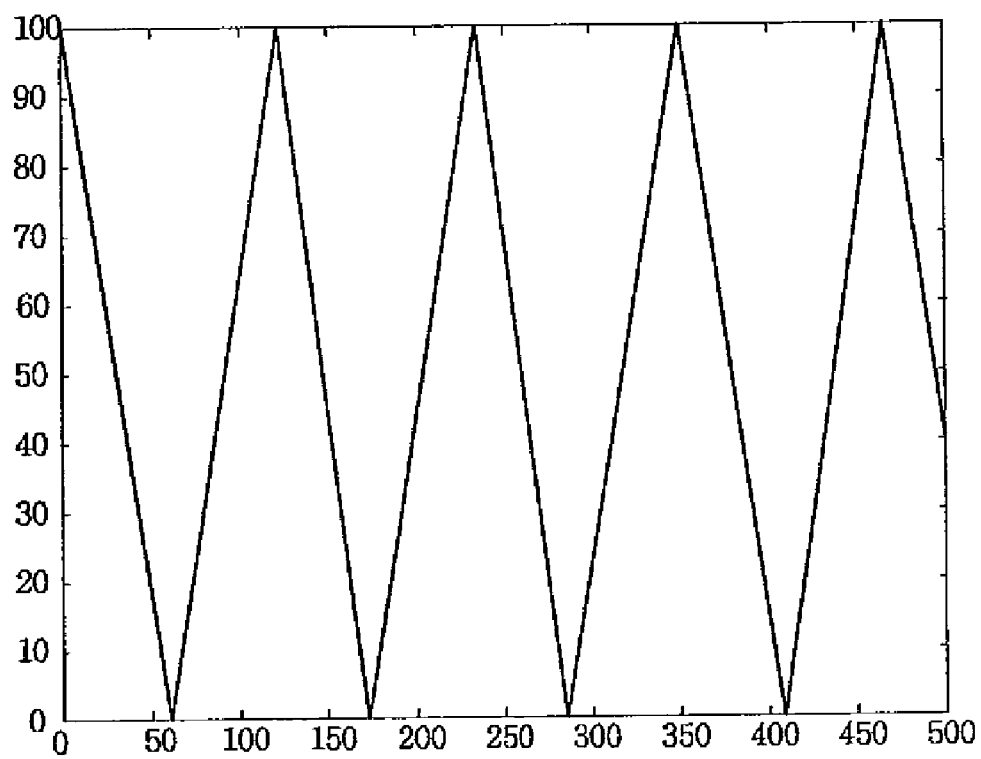
FIG. 12 illustrates a tracking position error signal graph generated in FIG. 11.

FIG. 11 is a rendition illustrating a servo pattern whose horizontal pitch is the same as the pitch of a sync pattern, where, if a pitch of a horizontal sync pattern (111) is 'W1', a pitch of a horizontal servo pattern (121) is 'W2', a pitch of the vertical servo pattern (121) is 'W3', and the pitch (W1) of a horizontal sync pattern (111) and the pitch (W2) of the horizontal servo pattern (121) is the same, a tracking position error signal 'PES' is generated as shown in FIG. 12 regardless of angles of the sync pattern and the servo pattern.

Under this circumstance, the more the angle is increased, the more the thickness of the pattern is decreased, and although the bit size is increased, the storage density is decreased. The following Table 2 shows principal factors that are extracted if the pitch of the horizontal sync pattern and the pitch of the horizontal servo pattern are the same, and if θ=30°.

TABLE 2

| Relations between Tracks | W3 = W1sinθ |
|---|---|
| Bit Size | If θ < 45°, bit size is W1tanθ, if θ = 45°, bit size is W1. |
| Track Pitch | W1tanθ |
| Horizontal distance between bits (Bit Length) | W1 |
| TPI (Track per Inch) | $\dfrac{1\text{ inch}}{W1\tan\theta}$ |
| Storage Density | $\dfrac{S}{W1\tan\theta}$ |

Figure 13:
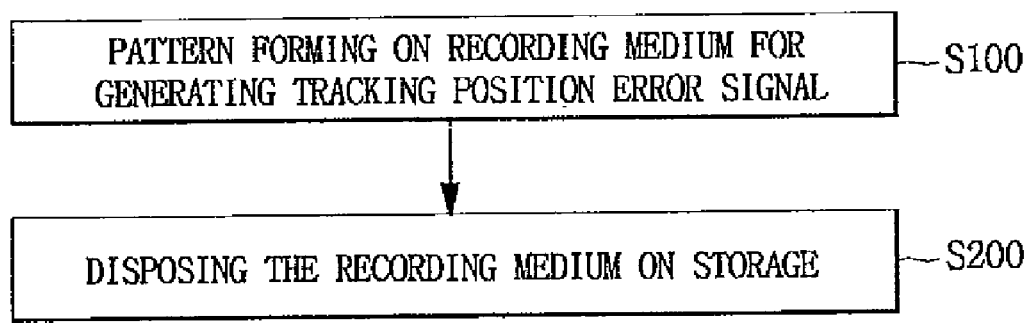
FIG. 13 illustrates a schematic flowchart for explaining an assembling method of a data storage apparatus.

FIG. 13 illustrates a schematic flowchart for explaining an assembling method of a data storage apparatus, where an upper partial portion of the recording medium is first formed with patterns capable of generating the tracking position error signals (S100).

Thereafter, a storage storing data in the recording medium using signals detected by the patterns is assembled by positioning on an upper portion of the recording medium (S200).

Preferably, the process of forming patterns capable of generating the tracking position error signals on the upper partial portion of the recording medium is a process where a nano imprint process is performed on the recording medium to form patterns capable of generating the tracking position error signals. The nano imprint process is to apply pressure to the recording medium by a stamp to form patterns capable of generating the tracking position error signals. The nano imprint process has an advantage in that patterns can be formed on the recording medium promptly and at a reduced cost. Preferably, the patterns capable of generating the tracking position error signals include sync patterns comprised of striped indentations formed on the recording medium and servo patterns comprised of inclined indentations. Preferably, the recording medium (100) is made of polymer.

Therefore, the instant novel disclosure has an advantage in that a recording medium is formed with patterns capable of generating a tracking position error signal before the recording media and storage are assembled to thereby reduce the manufacturing cost and manufacturing process time.

While the present novel concept has been described with reference to the particular illustrative implementations, it is not to be restricted by those implementations but only by the appended claims. It is to be appreciated that those skilled in the art can change or modify the implementations without departing from the scope and spirit of the present disclosure.

What is claimed is:

1. A data storage apparatus, comprising:
   a recording medium formed with a striped first pattern and an inclined second pattern on an upper partial portion of the recording medium; and
   a storage unit configured to store data in the recording medium using signals corresponding to where the patterns are detected,
   wherein the striped first pattern is a sync pattern while the inclined second pattern is a servo pattern, and
   wherein a horizontal pitch of the sync pattern is the same as a vertical pitch of the servo pattern.

2. The apparatus as claimed in claim 1, wherein the data storage apparatus is an SDS {SPM (Scanning Probe Microscope)-based Data Storage System}.

3. The apparatus as claimed in claim 1, wherein the patterns are tracking position error signals.

4. The apparatus as claimed in claim 1, wherein the storage unit is configured to store data on the recording medium according to one of an electrical, magnetic, optical and physical transformation method.

5. The apparatus as claimed in claim 1, wherein the first pattern and the second pattern are formed on a respectively different position on the same recording medium.

6. A data storage apparatus, comprising:
   a recording medium formed with a striped first pattern and an inclined second pattern on an upper partial portion of the recording medium; and
   a storage unit configured to store data in the recording medium using signals corresponding to where the patterns are detected,
   wherein the striped first pattern is a sync pattern while the inclined second pattern is a servo pattern, and
   wherein a horizontal pitch of the sync pattern is the same as a horizontal pitch of the servo pattern.

7. An apparatus for generating a tracking position error signal, comprising:
   a first cantilever unit configured to detect a servo pattern of a recording medium formed with a servo pattern and a sync pattern capable of generating a tracking position error signal, and to output a signal;
   a second cantilever unit configured to output a signal by detecting the sync pattern of the recording medium;
   a first comparator configured to receive the signal outputted by the first cantilever unit and to receive a reference signal, to compare the signal with the reference signal, and to output a signal relative to a comparative result;
   a second comparator configured to receive the signal outputted by the second cantilever unit and to receive the reference signal, to compare the signal with the reference signal, and to output a signal relative to a comparative result;
   a frequency multiplier configured to multiply a frequency of the signal outputted by the second comparator and to output a reference clock signal;
   a counter configured to count the reference clock signal by receiving the reference clock signal of the frequency multiplier and to output a tracking position error signal; and
   a digital logic processor configured to receive the signals from the first and second comparators and to output to the counter one signal out of a start signal, a stop signal and a reset signal.

8. The apparatus as claimed in claim 7, wherein
the sync pattern comprises striped indentations on an upper portion of the recording medium; and
the servo pattern comprises inclined indentations on an upper portion of the recording medium.

* * * * *